UNITED STATES PATENT OFFICE 2,397,920

STABILIZATION OF OILS AND FATS

Mayne R. Coe, Jr., Seabrook, Md., and Mayne R. Coe, Washington, D. C., assignors to the United States of America as represented by the Secretary of Agriculture No Drawing. Application April 27, 1943,
Serial No. 484,738

5 Claims. (Cl. 260—398.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for retarding development of rancidity in non-stable vegetable glyceride oils and animal glyceride fats, which may be either the oils, the fats, or a mixture of them, and has particular application to the edible oils and fats, such as lard, beef fat, hydrogenated cottonseed oil, other similar oils and fats and foods containing them.

For the purpose of illustration, the invention is hereinafter described with reference to lard. As is well known, lard, like others of the vegetable glyceride oils and animal glyceride fats, usually becomes rancid when exposed to light and air or when heated in an oven or in a Swift stability apparatus.

The present invention is based on the discovery that the tendency of lard to become rancid is retarded by the combined treatment of it with classes of substances including certain human digestive enzymes, including trypsin, pepsin, and clarase, and vitamin E, otherwise known as tocopherol, in any of the alpha, beta or gamma forms, with or without certain fruit acids, such as citric acid, and that the combined action of these classes of substances is much greater than expected from their additive effects.

It is known that each of these treating substances, when used alone, produces anti-rancidity effects.

The following table, illustrating examples and tests of them, shows the effects of the treatment with the various substances when used alone, and the increased effect when used together. In all the examples, the tests were made on 20-gram lots of lard, having a peroxide value when fresh of 4.01, over a time interval of 21 hours, at a temperature of 70° C., in a Swift stability apparatus. The peroxide values shown in the table were obtained at the end of the test period by the Wheeler method.

TABLE

Sample tested (lard, 20 g. lots)

| | Peroxide value (average) |
|---|---|
| (1) Untreated | 204.60 |
| (2) Treated with 20 mg. of tocopherol | 17.37 |
| (3) Treated with 100 mg. of trypsin | 124.60 |
| (4) Treated with 100 mg. of pepsin | 170.00 |
| (5) Treated with 100 mg. of clarase | 140.00 |
| (6) Treated with 100 mg. of citric acid | 180.00 |
| (7) Treated with 20 mg. of tocopherol plus 100 mg. of trypsin | 4.78 |
| (8) Treated with 20 mg. of tocopherol plus 100 mg. of pepsin | 13.19 |
| (9) Treated with 20 mg. of tocopherol plus 100 mg. of clarase | 6.83 |
| (10) Treated with 20 mg. of tocopherol plus 50 mg. of trypsin plus 20 mg. of citric acid | 6.06 |
| (11) Treated with 20 mg. of tocopherol plus 50 mg. of pepsin plus 20 mg. of citric acid | 6.47 |
| (12) Treated with 20 mg. of tocopherol plus 50 mg. of clarase plus 20 mg. of citric acid | 7.71 |
| (13) Treated with 20 mg. of tocopherol plus 20 mg. of citric acid | 9.04 |

Apparently the action of the enzymes with the vitamins or with the vitamins and fruit acids is to alter the rate of oxidation of the oils and fats by producing a negative catalysis effect or by overcoming a natural influence of oxygen for initiating an oxidation of the oils and fats. Tocopherol used alone is well known to have antioxidant properties, but the increased effect produced by it with an enzyme with or without a fruit acid has not been known before. Tocopherol with the enzymes stabilizes much better than does tocopherol alone and much better than would be expected from their additive effects. Also, tocopherol with the enzymes and citric acid gives better stabilization than does citric acid alone, tocopherol alone, citric acid and tocopherol together, or tocopherol and trypsin together.

The same increase in stabilization is obtained if the enzymes are added to tocopherol prior to treatment of the lard with them.

The results bear out that the enzymes and vitamins, especially those that resist the effect of heating, play a major role in retarding the autooxidation of the oils and fats. Trypsin produces more antioxidant effect than do the other enzymes, possibly because it is not destroyed so rapidly by heat at the testing or at higher temperatures. Pepsin and clarase show signs of being destroyed by heat, although the by-products, produced as a result of their decomposition, still possess decided antioxidant properties.

At ordinary room temperature or at storage temperature the increased effect of retarding development of rancidity by combining the antioxidants of this invention is most pronounced, and the stability period is correspondingly greatly enhanced.

Other oils and fats, such as the fats used for deep frying and baking, are also well stabilized.

Stabilization according to this invention may be effected most economically by using concentrations of vitamins and enzymes from animal and vegetable sources rather than by using highly purified forms, and also by using materials high in the necessary vitamins and enzymes without concentrating them.

The proportions of vitamins, enzymes and fruit acids, and the manner of treating the oils and fats with the substance, may be varied. Any manner of adding to and mixing that thoroughly incorporates the substances into the oils and fats is satisfactory.

Having thus described the invention, what is claimed is:

1. A process for retarding development of rancidity in non-stable vegetable glyceride oils and animal glyceride fats, comprising adding to and mixing with them tocopherol plus an enzyme, selected from the class consisting of trypsin, pepsin, and clarase.

2. A process for retarding development of rancidity in non-stable vegetable glyceride oils and animal glyceride fats, comprising adding to and mixing with them tocopherol plus trypsin.

3. A process for retarding development of rancidity in non-stable vegetable glyceride oils and animal glyceride fats, comprising adding to and mixing with them tocopherol plus pepsin.

4. A process for retarding development of rancidity in non-stable vegetable glyceride oils and animal glyceride fats, comprising adding to and mixing with them tocopherol plus clarase.

5. A composition of matter, comprising non-stable vegetable glyceride oils and animal glyceride fats having added thereto tocopherol and an enzyme selected from the class consisting of trypsin, pepsin, and clarase.

MAYNE R. COE, JR.
MAYNE R. COE.